Figure 1:
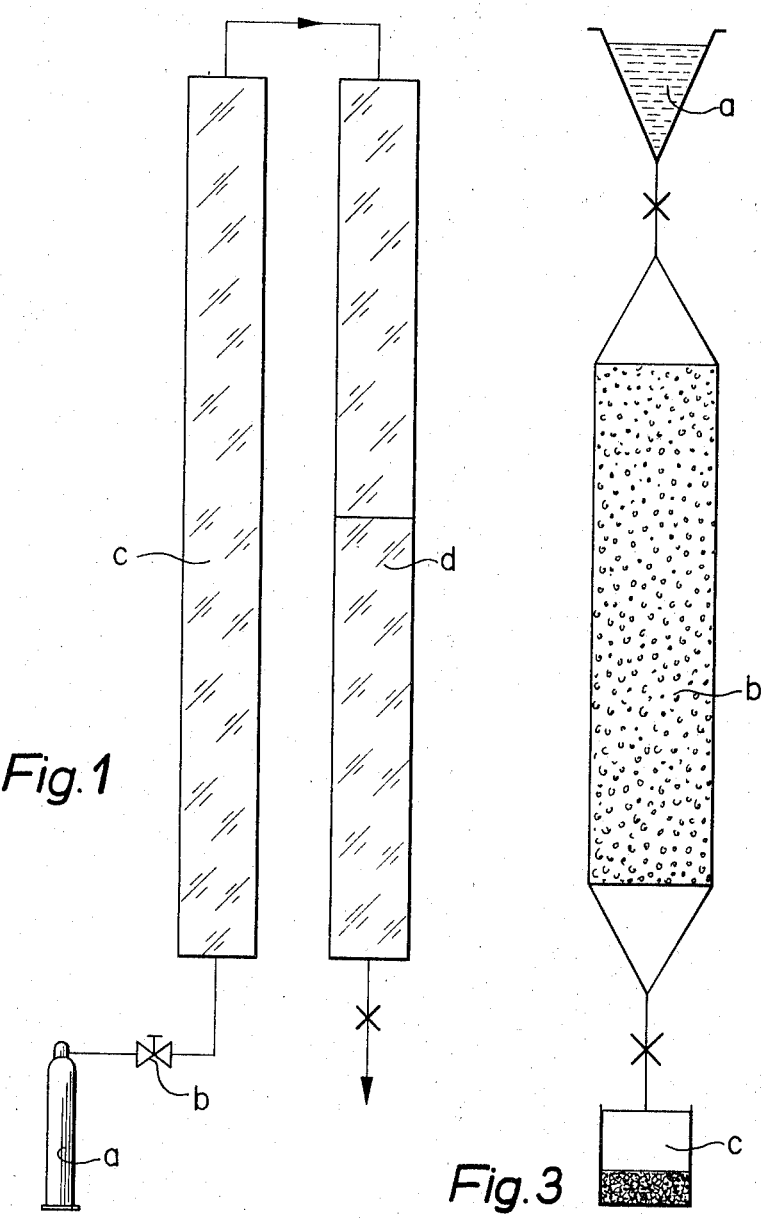

United States Patent
Krauss et al.

[11] 3,852,406
[45] Dec. 3, 1974

[54] METHOD OF REMOVING OXYGEN FROM GASES

[75] Inventors: Hans Ludwig Krauss; Hans Stach, both of Munich, Germany

[73] Assignee: Messer Griesheim GmbH, Frankfurt/Main, Germany

[22] Filed: July 1, 1971

[21] Appl. No.: 159,049

Related U.S. Application Data

[63] Continuation of Ser. No. 737,425, June 17, 1968, abandoned.

[30] Foreign Application Priority Data
June 20, 1967 Germany.................................. 62598

[52] U.S. Cl.................. 423/219, 423/230, 423/239, 423/240, 423/241, 423/244, 423/245, 423/247
[51] Int. Cl............................................. B01d 53/34
[58] Field of Search................ 23/25, 3 L, 209, 221; 210/20, 59; 423/217–219, 579

[56] References Cited
UNITED STATES PATENTS

| | | | |
|---|---|---|---|
| 2,783,134 | 2/1957 | Hughes et al. | 23/221 |
| 2,783,134 | 2/1957 | Hughes et al. | 423/579 |
| 3,361,531 | 2/1968 | Erb et al. | 23/25 |
| 3,682,585 | 8/1972 | Frevel et al. | 423/219 |

OTHER PUBLICATIONS
A.P.C. Application of Martin, Ser. No. 353,130, published April 27, 1943.

Primary Examiner—Earl C. Thomas
Attorney, Agent, or Firm—Ernest F. Marmorek

[57] ABSTRACT

Method of removing oxygen from gases by contacting said gases with a chromium oxide containing mass which has been activated by heating with oxygen at a temperature of about 300°C. to about 600°C. to form a higher chromium oxide and thereafter reduced to a lower chromium oxide by treatment with a reducing gas.

2 Claims, 3 Drawing Figures

METHOD OF REMOVING OXYGEN FROM GASES

The application is a continuation of Ser. No. 737,425, filed June 17, 1968 and now abandoned.

This invention relates to the removal of oxygen admixtures of impurities homogeneously dissolved in gases or liquids dissolved in gases or liquids.

It is often necessary to free gases and liquids from oxygen, for example in order to obtain gases or liquids in pure form, or in order to avoid disturbances caused by the presence of oxygen, or for the analytical determination of oxygen.

Various steps for the removal of such admixtures by chemical or physical procedures have been known, for example from the German Patent No. 965,634; Zs. f. Angew. Chemie 70, pp. 697–699 (1958) and 72, pp. 132–135 (1960). However, these known procedures have more or less essential disadvantages and this is ture particularly in connection with processes for the removal of oxygen. Some of the known processes are troublesome and expensive and some can be used in special cases only. Furthermore, frequently the removable amount of oxygen does not meet the practical requirements, particularly if a relatively small amount of oxygen has to be removed. In many cases, several of these disadvantages occur simultaneously.

The main object of the present invention is, therefore, the improvement and simplification of the removal of admixtures or impurities homogeneously dissolved in gases or liquids oxygen, from gases or liquids.

In the process for the removal of admixtures or impurities homogeneously dissolved in gases or liquids oxygen, from gases or liquids, according to the present invention, said gases or liquids are brought in contact with a mass from an active iron- , nickel- , rhenium- , preferably titanium- , manganese- , vanadium- , molybdenum- and/or chromium- containing component, said mass having been activated at 300° to 600°C with molecular oxygen, and subsequently treated at elevated temperature under mild conditions with a gas having a reducing effect, on a heat-proof oxidic carrier having a large surface.

A considerable number of heatproof oxidic carrier materials have been known from the art. For the purposes of the present invention, for example oxides of silicon, aluminum, zirconium and thorium and mixtures thereof can be used. The surface of these carrier materials is preferably in the range of 200 to 500 m²/g. Some examples of such carrier materials are as follows:

Preparation of the mass in condition ready for use is carried out in three steps:

1. Application of the transition metal to the carrier;
2. Activation with oxygen at elevated temperature; and
3. Treatment with a reducing gas, likewise at elevated temperature.

In applying the active ingredient to the carrier, the conventional steps known from the art can be used. It is appropriate to impregnate the carrier with an aqueous solution of the selected transition metal compound. Some examples of such metal compounds which have been applied to the carrier in aqueous solution, are listed in Table II, column 2, further below. It is preferred to use for impregnation the aqueous solution in such an amount and concentration that the impregnated air-dry carrier contains the metal component in a proportion of 1–5% by weight calculated on the metal content, But larger or smaller proportions may also be used.

The ceramic mass may, for instance, be composed of silica gel with a granulation size of from 0.2 to 0.5 mm, and the finished, dried and activated mass will have a chromium content of 1.4 per cent by weight.

Subsequently, the mass is dried and activated with molecular oxygen at elevated temperature. For example, a current of pure oxygen or of an oxygen-containing gas, for example air, is conducted through the mass at a temperature of 300° to 600°C. The necessary duration of the activation varies in dependence on the temperature used and on the oxygen-content of the gas current. For example, in the use of 125 g Kieselgel Merck, No. 7733 containing 1% chromium and of an air current velocity of 100 liters per hour at 500°C the activation requires a treatment for about 30 minutes. After activation the metals are located in the form of "surface compounds" on the carrier, in a relatively high degree of oxidation. For example, the oxidation index, or number, is in the case of the carrier "Marlex" (see Table I) at 1% chromium about 5.7 and in the case of the carrier "MS 969" (see Table I) about 5.9. Depending on the transition metal component present in the activated masses, the latter exhibit characteristic colorations. These colorations of the masses appearing after activation, are shown in column 4 of Table II further below.

After the activation with oxygen the masses are treated with reducing gases at elevated temperature.

Table I

| Designation | Manufacturer | Composition | Surface | Granulation |
|---|---|---|---|---|
| Marlex | Phillips Petroleum Company | $SiO_2$ 77% $Al_2O_3$ 13% $H_2O$ 10% | about 400 m²/g | Powder |
| MS 969 | BASF | $SiO_2$.aq | about 300 m²/g | Powder |
| Aerosil | Wacker No. 2491 | $SiO_2$.aq | about 320 m²/g | Powder |
| Kieselgel | Merck No. 7733 | $SiO_2$.aq | | 0.2–0.5 mm |
| Kieselgel | Schuchardt No. 51157 | $SiO_2$.aq | | 2 – 5 mm |
| $Al_2O_3$ for Chromatography | Riedel-De Haen No. 31164 | $Al_2O_3$aq. | | 0.2–0.5 mm |

Examples for suitable gases are described in Table III, further below, according to which chromium-containing masses were reduced. Reduction can be carried out particularly efficiently with hydrogen and particularly with carbon monoxide, and in view of this, and their easy availability, these gases are preferred. If desired, the reducing gases may be diluted with inert gases. Reduction of the masses is carried outlike activation – in a gas current. In general, the reduction requires a temperature of at least 200°C. and a period of some minutes. The optimum of the reduction temperature depends on the nature of the gas selected, as well as the nature of the mass to be treated. Table II (see further below) discloses the temperatures to be used with advantage for the reduction with CO of various masses which contain various transition metal components. Table III discloses the favorable reduction temperatures in the use of various reducing gases in the example of chromium-containing masses. (The optimum conditions for other cases can be easily determined by preliminary tests.)

In carrying out the invention, however, it should be taken into consideration that the choice of the reducing gas and of the conditions of reduction – such as temperature and period of treatment – is of decisive influence for the efficiency of the finished masses. Thus, the reducing reaction is rendered more difficult by the presence of water. For this reason, the use of reducing gases, such as hydrogen, saturated hydrocarbons – which may react during reduction with the formation of water – is less efficient than carbon monoxide which is oxidized - to the harmless carbon dioxide. Furthermore, it is known that during heating water is split off from —OH groups of the carrier with the formation of oxide bridges. Therefore, reduction should be carried out as much as possible under mild conditions. Finally, at relatively high temperatures an irreversible change of the surface takes place, and a likewise irreversible shift of the reduction products into deeper layers of the carrier material. The metal atoms bound in this manner, do not have anymore the advantageous effect according to the invention, in spite of eventually low oxidation numbers.

The changes which take place during the treatment with reducing agents, are not known in all details. However, it is certain that the transition metals used, which are present preponderantly in higher stages of oxidation after activation with oxygen, are substantially converted into lower stages of oxidation while the reducing agent used is oxidized.

For example, by the reduction of activated chromium-containing masses with carbon monoxide for 10 minutes at 250°C and 1 atmosphere pressure, products are obtained in which the oxidation number of the chromium is $2.0 \pm 0.1$. However, this low oxidation number, which is essential for the usefulness of the mass in the process according to the invention, is not attained if the process is carried out at a temperature which is too high or by a reduction period which is too long, because these conditions cause the occurrence of the above mentioned troublesome effects. To be sure, it has been known that chromium-containing masses – for example masses of the type used in catalytic processes for the polymerization of ethylene or for dehydrogenizing hydrocarbons – can be reduced at 500°C with hydrogen or carbon monoxide and that the products of reduction are sensitive to oxygen, like an aqueous Cr(II)-solution; however, in the products known up to date more than 50% of the chromium are present in the form of chromium(III) which is not sensitive to oxygen.

In all cases the occurrence of coloration of the masses can be visually observed during reduction. Tables II and III herein list various examples of such changes of color. As the change of color during conversion of the masses from the activated form into the reduced form occurs rather sharply, and is distinctly perceptible, it can be used with advantage for detecting termination of the reduction.

It has been generally known that some compounds of transition metals having a low oxidation number, for example compounds of Cr(II) or Ti(III), react also in solution or in pure form with oxygen. However, for the extraordinary efficiency of the masses according to this invention, described further below, the presence of these oxidation stages in surface compounds, is decisive. In this form or condition, it is possible to use also compounds, the low valence stages of which usually do not show sensitiveness to oxygen, for example compounds of rhenium or nickel. For forming the surface compounds, the above described activation under oxidizing conditions is a necessary precondition, If, in contrast to the above, the metal compounds of low oxidation index are furnished as such to the carrier, the resulting products will not have the utility of products prepared according to the present invention.

The masses obtained according to the above described treatment are ready for use in carrying out the process of the invention. If it is not intended to submit the used reducing gas itself to the process of the invention, it may be appropriate to remove reducing gas, which has been retained by masses embodying the invention, prior to carrying out the process of the invention, through desorption with an inert gas, for example nitrogen or by the gas to be purified. It will be appreciated that the process of the invention utilizes a surprising characteristic of the masses prepared in the above described manner, namely the characteristic of being capable to bind the above described admixtures and/or impurities.

It has been already stated that by impregnating a silicon dioxide-aluminum oxide carrier with a chromic acid solution, drying, activation by heating in an air current at 550°C for 4 hours and heating with carbon monoxide at 100 mm to 250°C, a composition is obtained which catalyzes polymerization of ethylene at low temperatures. The same result is attained if – instead of the treatment with carbon monoxide under the above stated conditions – a 1 hour treatment with 6.5 mol ethylene per gram-atom of chromium is carried out at 150°C, whereas a treatment with hydrogen at elevated temperature does not yield the desired effect. Compositions of this type have been suggested exclusively for the polymerization of ethylene.

It is, therefore, rather surprising that a great number of homogeneously distributed admixtures described above, can be removed from gases or liquids, by contacting said gases or liquids with the above disclosed masses. Thereby the admixtures are removed from the gases or liquids and taken up by the masses. The manner in which the admixtures are taken up by the masses is not known, but it is assumed that the admixtures are essentially chemically bound by the active component of the masses which are, therefore, denoted "chemisorption agents" herein. Of the various admixtures, oxygen is bound most strongly. It has been found that oxygen is capable of displacing other admixtures which are already bound to the masses embodying the invention. Furthermore, as the known procedures for the removal of oxygen are – in comparison to known procedures for the removal of other admixtures – practically the least satisfactory, it is preferred to use the process of the present invention for the removal of oxygen.

The capacity of the chemisorption agents to take up oxygen decreases as their load is increased, until finally said capacity is exhausted. This condition can always be recognized also visually. For example, in the use of chromium-containing chemisorption agents which, as stated above, are of a blue color after treatment with a reducing agent, it can be observed that taking up of oxygen is accompanied by a sharp color change to brown-yellow. When the original color of the mass disappears, its capacity of taking up oxygen is exhausted. In the case of other admixtures, such color changes likewise occur, as can be seen from Table IV. The exhausted chemisorption agents can be regenerated by a simple procedure and used again, in the manner described further below.

The removal of oxygen according to the invention from gaseous or liquid media can be carried out within a very wide temperature range. The lower limit of this range is essentially determined by practical reasons. For example, in the use of chromium-containing masses, useful results were obtained even upon cooling to the temperature of liquid air. Experimental verification showing useful results have been obtained as can be seen from Table II. As to elevated temperatures, the useful temperature range extends up to the temperature of thermal stability of the higher oxides formed under activating conditions. Within this wide range, in individual cases the most appropriate temperature can be selected. In many cases, it is particularly advantageous to carry out the process at ordinary room temperature, because thereby neither the supply of heat nor cooling is required.

The capacity of the masses is determined by the Redoxstep occurring during chemisorption. For example, it has been found that in the use of chromium-containing masses 0.65 to 0.85 mol $O_2$ were taken up per g-atom Cr.

The process of the invention can be applied to numerous gases and liquids. From the gases named in the following list, oxygen can be removed at 20°C.

Noble gases
hydrogen
nitrogen
carbon monoxide
carbon dioxide
hydrogen sulfide*
ammonia*
hydrogen halides*
saturated hydrocarbons

*Activation after use is required.

Ethylene can also be purified according to the invention from oxygen, with activation after use, but the temperature range between −45°C and +200°C cannot be used, because in this range polyethylene is formed.

The term "gases" is used herein to include vapors of materials which are normally liquid. Examples of liquid media, from which oxygen can be removed according to the invention are: saturated hydrocarbons, aromatic hydrocarbons and ethers.

Oxygen can be removed from gases and liquids according to the present invention practically quantitatively. For example, after passing air at room temperature through a chromium-containing chemisorption agent, a gas practically free from oxygen was obtained, the oxygen content of which was below 1 part per million, namely below the limit detectable by mass spectrometer. The German Patent No. 965,634 states that by the use of catalysts described therein, oxygen can be very efficiently removed. For comparison, a mixture of oxygen and nitrogen was passed over such a catalyst and subsequently the nitrogen thus purified was allowed to pass through a chromium-containing mass embodying the present invention. By this step a considerable amount of oxygen could be still removed from the preliminarily purified nitrogen.

Regeneration of chemisorption agents whose capacity is exhausted due to loading with oxygen, can be brought about by the same treatment as described above for the preparation of masses embodying the invention. By such regeneration, the original take-up capacity for oxygen is restored. Thereby, the above described color-change can be utilized in determining the end of the regeneration treatment. If the media, from which the oxygen present therein is supposed to be removed, are reducing gases of the type to be used in the above described reducing treatment for the preparation of chemisorption agents, the process can be carried out continuously without the necessity of regenerating the chemisorption agent. In such a case, the gas is contacted at temperatures equal to those stated above for the treatment with reducing gases during preparation of the chemisorption agents. It is not known whether under the conditions first a chemisorption of the oxygen by the mass and subsequently a regeneration by the reducing gas takes place, or whether both reactions take place simultaneously. It has been found, however, that the efficiency of the mass in thereby preserved, so that this embodiment can be considered as the combustion of the reducing gas by oxygen and the mass acts as if it were a catalyst. In some cases the combustion product can be left without disadvantage in the gas treated, but it can be removed by conventional steps, if necessary. The continuous procedure of carrying out the invention can be applied also to gases which are not suitable, or only little suitable, for the reducing treatment in producing the chemisorption agent, but are oxidized by oxygen in the presence of chemisorption agents of the present invention under conditions of that kind.

Many of the here described chemisorption agents have a long life period and can be repeatedly loaded and regenerated by simple reduction. After extensive use, however, reactivation with oxygen or an oxygen-containing inert gas at elevated temperature may be appropriate, under conditions equal to those described above in connection with the preparation of the masses. This can be done, for example, in order to remove coatings which have been formed on the chemisorption agents after extensive use and many diminish their efficiency. After reactivation with oxygen, still the above described treatment with reducing gases must, of course, be carried out, prior to use. How many times a chemisorption agent can be loaded and subsequently regenerated by simple reduction before reactivation with oxygen is necessary, depends also on the nature of the gas used for reduction, as can be seen from Table III.

Table II

| 1 Metal | 2 Addition of Aqueous Solution of | 3 Activation with Air at | 4 Color of the Activated Form |
|---|---|---|---|
| Ti | TiCl$_3$ | 500°C | white-yellowish |
| V | (NH$_4$)$_3$VO$_4$ | do | white |
| Cr | CrO$_3$ | do | yellow-brown |
|  | Cr(NO$_3$)$_3$ | do. | yellow-brown |
| Mo | (NH$_4$)$_3$MoO$_4$ | do. | white |
| Mn | Mn(NO$_3$)$_2$ | do. | black-brown |
| Re | Re$_2$O$_7$ | do. | white |
| Fe | Fe(NO$_3$)$_3$ | do. | red |
| Ni | Ni(NO$_3$)$_2$ | do. | black-brown |
| 5 Reduction with CO at | 6 Color after Reduction | 7 Minimum Temperature for Reaction with O$_2$ | 8 Remarks |
| 350°C | blue | < 20°C | reversible |
| 320°C | black | 120°C | do. |
| 250°C | blue[1] | −190°C | do. |
| 250°C | blue[1] | −190°C | do. |
| 350°C | gray-brown | 120°C | do. |
| 350°C | gray-green | 120°C[2] | do. |
| 300°C | black-brown | 150°C | do. |
| 250°C | black | 120°C | do. |
| 200°C | gray-green | 120°C[3] | do. |

[1] After desorption of CO by N$_2$ (violet-blue previously)
[2] At 20°C slow reaction with color change to brown
[3] At 20°C slow reaction Table III Reduction of masses furnished with chromium, with various gases:

| Gas |  | Temperature of Reduction | Color of the Reduced Mass | Efficiency in Removing O$_2$ |
|---|---|---|---|---|
| CO | 1) | 250°C | violet-blue | outstanding |
| H$_2$ | 2) | 350°C | blue-green | very good |
| Methane | 3) | 300°C | blue-green | good |
| Propane | 3) | 400°C | gray-green | moderate |
| Ethylene | 3) | >200°C | blue-green | satisfactory |
| Illuminating gas | 3) | 350°C | blue-green | satisfactory |

1) Fully reducible after reaction with oxygen
2) Reducible 2–3 times only, then activation is necessary
3) Activation required, after consumption The process of the invention can be used, for example, for purifying gases or liquids from admixtures of oxygen. Such purification is necessary if, for instance, the presence of oxygen has a disturbing influence due to its chemical reactivity. Thereby, frequently an extraordinarily low oxygen concentration is required and thereby the expense of purification becomes constantly higher with increasing requirements with reference to the concentration of oxygen. As the chemisorption agents are very easily available and nevertheless capable to remove oxygen with extraordinary efficiency, it is particularly advantageous to apply the process of the invention to gases or liquids, in which the oxygen content is relatively low, but does not meet the requirements of practice. Such after-purification is necessary, for example, in noble gases which are produced on commercial scale and used in large amounts, for instance in arc welding with a protective gas, as inert gas filling in incandescent lamps, as vehicles of the passage of current and of the production of radiation in low-pressure discharge lamps and high pressure discharge lamps, as fuse gas in mercury vapor lamps and sodium vapor lamps or in electronic circuit components, for example rectifiers. Nitrogen produced on large-scale must be likewise freed from its oxygen content for many of its applications. Nitrogen is the most frequently used protective or inert gas. For example, in the production of nylon nitrogen free from oxygen is needed in large amounts for the reaction of adipic acid with hexamethylene diamine and as a protective gas during spinning. Further examples are: tempering of alloy-steel by annealing in a stream of nitrogen free from oxygen and the use of nitrogen as carrier gas for trace elements which are introduced into germanium crystals in the manufacture of diodes and transistors and also in the production of semiconductors of highest purity. It will be appreciated that application of the procedure according to the present invention offers advantages also in many other cases, for example in the removal of small amounts of dissolved oxygen from solvents, which are used in the manufacture of sensitive products, or in the recovery of a gas in pure form from mixtures of the desired gas with oxygen only, or together with other admixtures. The following Table IV contains examples for such substances other than oxygen, which are bound by reduced masses used according to the invention by chemisorption. The tests on which the data of Table IV are based, were carried out with chromium-containing masses.

Table IV

| Gas | Reaction Temperature C | Color Change from Blue to | Reactivity to O$_2$ at 20°C | Remarks |
|---|---|---|---|---|
| CO | 20° | violet | very good | Can be activated with oxygen at 500°C |
| SO$_2$ | do. | yellow-brown | — | do. |
| H$_2$S | do. | black-brown | moderate | do. |
| NO | do. | dark brown | moderate | do. |
| NH$_3$ | do. | violet | very good | do. |
| Cl$_2$ | do. | green | — | do. |
| HCl | do. | beige | satisfactory | do. |
| Vapor of Benzol | do. | green | satisfactory | do. |

Furthermore, the process of the invention can be used in the analytical determination of oxygen and in the semi-quantitative determination of very small amounts of oxygen about in the manner of the known Draeger tubules (see Gasspurgerat Draeger, H. Rompp, Chemielexikon, 6th Edition, 1966, Stuttgart, page 1599).

Figure 2:
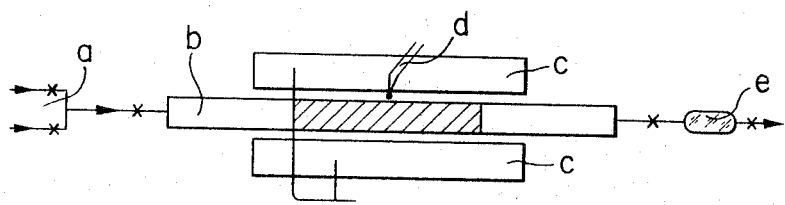

Devices suitable for carrying out the process of the invention are illustrated in FIGS. 1, 2 and 3 of the drawings.

FIG. 1 illustrates an arrangement for the removal of oxygen, or other gaseous admixtures from nitrogen and other gases. The gas to be purified flows from the storage container a) - for example, a steel bottle containing technical nitrogen - over a connecting pipe to the container c) which has the shape of a column and is filled with the chemisorption agent. Said connecting pipe is provided with a relief pressure valve b) in order to prevent an excessive load in the arrangement if the pressure is suddenly increased. Said pipe may be provided with means (not shown) for regulating and measuring the gas current. From the container c) the gas free from oxygen flows over a connecting tube into the container d) which is filled with a drying agent, for example Mg)ClO$_4$)$_2$ and a CO$_2$-absorbent, for example soda-asbestos, in order to remove humidity and traces of CO$_2$. From the container d) dry gas free from oxygen is discharged. The device according to FIG. 1 is suitable for discontinuous operation, namely the chemisorption agent in container c) is loaded with oxygen or other admixtures until its capacity is exhausted. It is subsequently regenerated and if necessary reactivated and can be then used again.

The arrangement illustrated in FIG. 2 is adapted to be used for the continuous reaction of oxygen with a reducing gas and also for the treatment of fresh or used chemisorption agents with oxygen or reducing gases. The gas to be treated enters at a) and flows over a connecting line into the container b) which is filled with the chemisorption agent. The container b) is surrounded by a heating device c), for example by a tube furnace. By regulation of this heating device the desired temperature is adjusted and controlled by the temperature-measuring device d). The medium flowing off enters the container e) in which it is collected and, in the case of vapors, can be condensed or discharged for further use.

FIG. 3 illustrates an arrangement suitable for the removal of oxygen from liquids. It consists of a receiving vessel a), for example a dropping funnel for the liquid, and said funnel is connected with the container or column b) for the chemisorption agent. A collecting vessel c) for the treated liquid is arranged below the column b). The dropping funnel is filled with the liquid, for example diethylether, from which the oxygen is to be removed. A shutoff member, for example a cock, is provided between the vessel a) and column b) filled with the chemisorption agent, so that the flow of liquid into column b) can be regulated. The liquid flows by gravity through the filling downward and enters - through a connecting piece likewise provided with a shutoff member - collecting vessel c). In order to increase the velocity of flow, excess pressure can be applied to vessel a) or vacuum can be applied to column b) or vessel c).

The throughput of gas in the devices shown in FIGS. 1–3 is preferably in the range between 5 and 250 l/h. In the treatment of liquids the throughput usually amounts to for example 4 l/h.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A method for removing oxygen by chemisorption from a gas selected from the group consisting of hydrocarbons, ethers, nitrogen, argon, neon, krypton, xenon, and carbon dioxide, said method comprising contacting said gas with an activated mass including an impregnated heat proof oxidic carrier, said carrier having a surface area of about 200 to about 500 m$^2$/gm, said impregnated carrier being obtained by impregnating said carrier with an aqueous solution of CrO$_3$ or a chromium salt to obtain an air-dry impregnated carrier having a chromium content by weight of about 1% to about 5%, said mass being activated by treatment with oxygen at a temperature from about 300°C to about 600°C for a period of time of about 30 minutes to about 240 minutes and subsequently being reduced with carbon monoxide or hydrogen at a temperature in the range of about 250°C to about 400°C but at a temperature below said activating temperature for a period of time of about 5 minutes to about 60 minutes whereby the chromium in said impregnated carrier is changed from 6-value chromium to bivalent chromium.

2. A method of removing oxygen by chemisorption from an oxygen containing gas, comprising bringing said gas into contact with a mass consisting essentially of a heat proof oxidic carrier having a surface area of about 200 to about 500 square meters per gram and containing on the surface of said carrier about 1 to about 5 percent by weight of chromium in the form of a lower chromium oxide, said mass having been activated prior to said contact by treatment with oxygen at a temperature of about 300° to about 600° C to form a higher chromiumoxide and subsequent reduction of said higher chromium oxide to said lower chromium oxide by contact with a reducing gas at a temperature lower than said activation temperature.

* * * * *